United States Patent [19]

Callihan

[11] Patent Number: 4,964,771
[45] Date of Patent: Oct. 23, 1990

[54] CARGO RESTRAINER

[76] Inventor: Timothy N. Callihan, 2471 Pheasant Run Dr., Marylands Heights, Mo. 63043

[21] Appl. No.: 350,004

[22] Filed: May 10, 1989

[51] Int. Cl.$^5$ .............................. B61D 45/00
[52] U.S. Cl. .................... 410/118; 410/96; 410/103
[58] Field of Search ............ 410/118, 117, 103, 101, 410/96, 100, 102, 129, 94; 296/76; 206/591, 592; 220/1.5, 403; 188/65.1–65.5

[56] References Cited

U.S. PATENT DOCUMENTS

| | | | |
|---|---|---|---|
| 210,527 | 12/1878 | Harris | 410/100 |
| 3,357,520 | 12/1967 | Foote | 188/65.4 X |
| 3,438,673 | 4/1969 | Nelson | 296/37 |
| 3,782,758 | 1/1974 | Williamson, III | 280/179 R |
| 3,848,889 | 11/1974 | Sharrow | 410/103 |
| 3,980,196 | 9/1976 | Paulyson et al. | 220/1.5 |
| 4,054,267 | 10/1977 | Berg et al. | 410/103 X |
| 4,168,667 | 9/1979 | Loomis | 410/118 |
| 4,217,847 | 8/1980 | McCloud | 188/65.1 X |
| 4,436,466 | 3/1984 | Marino | 410/118 |
| 4,763,944 | 8/1988 | Fry et al. | 296/50 |
| 4,781,498 | 11/1988 | Cox | 410/118 |

FOREIGN PATENT DOCUMENTS 2196907 5/1988 United Kingdom ................ 410/118

OTHER PUBLICATIONS

"Modern Homesteader" Catalog, by Modern Farm, Dated Christmas 1988, Cover Sheet and pp. E-8.
1989 Models Brochure, Ford Motor Co., 1988, 2 pgs.

Primary Examiner—Douglas C. Butler
Attorney, Agent, or Firm—Senniger, Powers, Leavitt & Roedel

[57] ABSTRACT

A cargo restrainer for restraining cargo carried in a vehicle compartment having walls, such as the bed of a pick-up truck, the cargo restrainer including a generally rectangular panel of flexible material having sleeves extending along its opposing edges. A plurality of anchors are mounted at spaced apart locations on at least one wall of the vehicle comaprtment and cords extend through the sleeves of the panel and engage the anchors at their spaced apart locations to suspend the panel between the anchors with the panel opposing a wall of the vehicle compartment such that cargo may be placed between the wall and the panel for restraint of the cargo during transport. A locking member for holding the cords at a predetermined tension receives end portions of the cords through it, and a lever associated with the locking member may be moved from a first position in which the end portions are free of engagement by the lever such that the tension in the cords and thus the restraining force applied by the panel to the cargo may be adjusted by varying the length of the end portions extending through the locking member, and a second position in which the lever engages the end portions for releasably locking the end portions in the locking member to hold the tension applied to the cords.

17 Claims, 2 Drawing Sheets

U.S. Patent    Oct. 23, 1990    Sheet 1 of 2    4,964,771
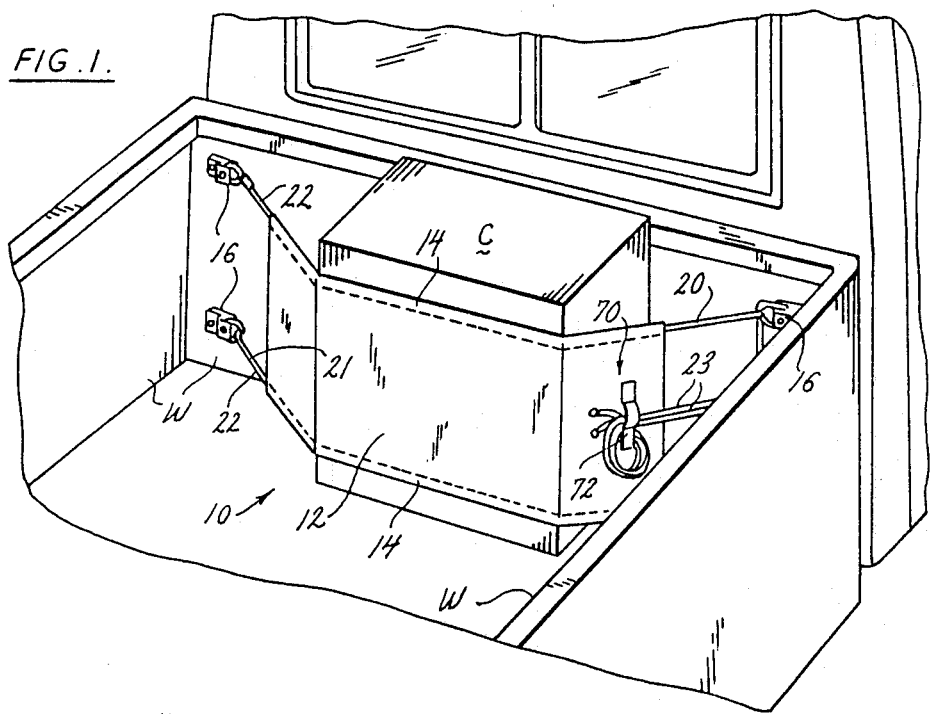
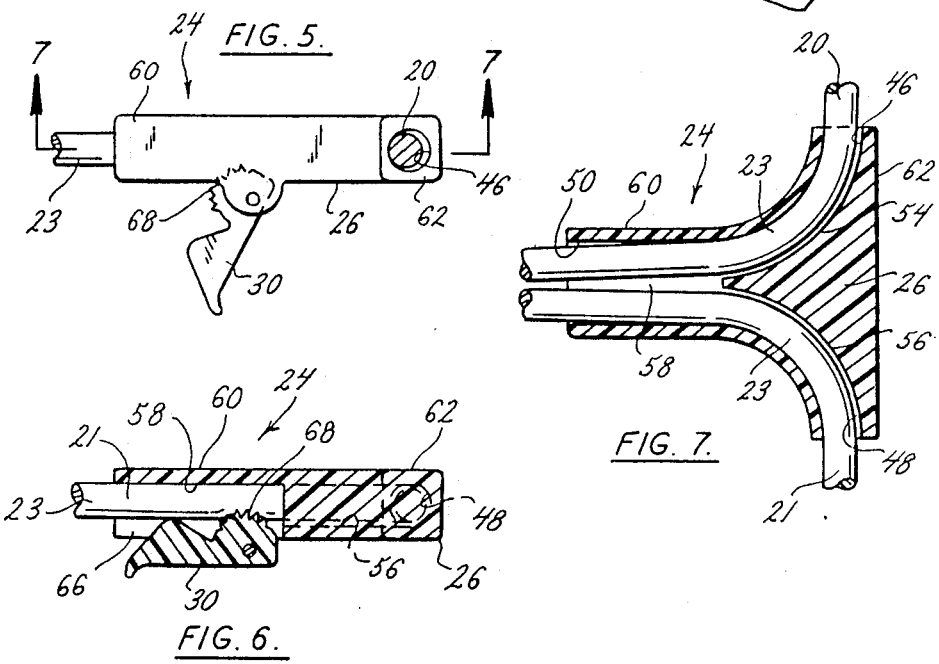

CARGO RESTRAINER

BACKGROUND OF THE INVENTION

The present invention relates generally to cargo restrainers of the type for holding cargo in a storage compartment of a vehicle from moving during transport and more particularly to flexible cargo restrainers of the kind mounted on walls of a vehicle compartment such as the bed of a pick-up truck.

In order to securely hold the cargo in place, the flexible cargo restrainer must be adjusted to tightly conform to the contour of the cargo being restrained. This involves pulling the restrainer over the cargo, which may be accomplished by pulling taught ropes, cords, straps or the like which are attached to the restrainer, and securing the restrainer to a wall of the compartment while holding the tension applied. Often the restrainer becomes loose while being secured because it is difficult to simultaneously hold the restrainer in tension and secure it. Depending on the amount or size of the cargo being restrained, there can be considerable excess rope or cord once the restrainer is secured thus presenting the problem of neatly holding the excess rope or cord, but quickly releasing it when it is required.

SUMMARY OF THE INVENTION

Among the objects of this invention is the provision of a flexible cargo restrainer which may be tightly conformed to the cargo with a desired restraining force; the provision of such a cargo restrainer which is quickly released to remove the cargo; the provision of such a cargo restrainer which is easily mounted on a wall or between two walls of a vehicle compartment; the provision of such a cargo restrainer which holds excess cord; the provision of such a cargo restrainer which is economical to manufacture.

Generally, a cargo restrainer for restraining cargo carried in a vehicle compartment having walls, such as the bed of a pick-up truck, of the present invention comprises a generally rectangular panel of flexible material having sleeves extending along opposing edges thereof. A plurality of anchors are adapted to be mounted at spaced apart locations on at least one wall of the vehicle compartment, and cord means extends through the sleeves of the panel engaging the anchors at said locations to suspend the panel between the anchors with the panel opposing a wall of the vehicle compartment whereby cargo may be placed between the wall and the panel for restraint of the cargo during transport. The cargo restrainer includes locking means for holding said cord means at a predetermined tension, the locking means comprising a locking member for receiving end portions of said cord means therethrough, and a lever associated with said locking member adapted for movement from a first position in which said end portions are free of engagement by the lever whereby the tension in said cord means and thus the restraining force applied by the panel to the cargo may be adjusted by varying the length of said end portions extending through said locking member, and a second position in which the lever engages said end portions for releasably locking said end portions in the locking member to hold the tension aPplied to said cord means.

Other objects and features will be in part apparent and in part pointed out hereinafter.

BRIEF DESCRIPTION OF THE DRAWINGS

FIG. 1 is a perspective of a cargo restrainer constructed according to the principles of the present invention shown restraining cargo against a wall of a pick-up truck bed;

FIG. 5 is an elevation of a locking member as viewed from line 5—5 of FIG. 2.

FIG. 6 is a horizontal section of the locking member of FIG. 2 taken in the plane of including line 6—6;

FIG. 7 is a section of the locking member of FIG. 5 taken in the plane including line 7—7.

Corresponding reference characters indicate corresponding parts throughout the several views of the drawings.

DETAILED DESCRIPTION OF A PREFERRED EMBODIMENT

Figure 2:
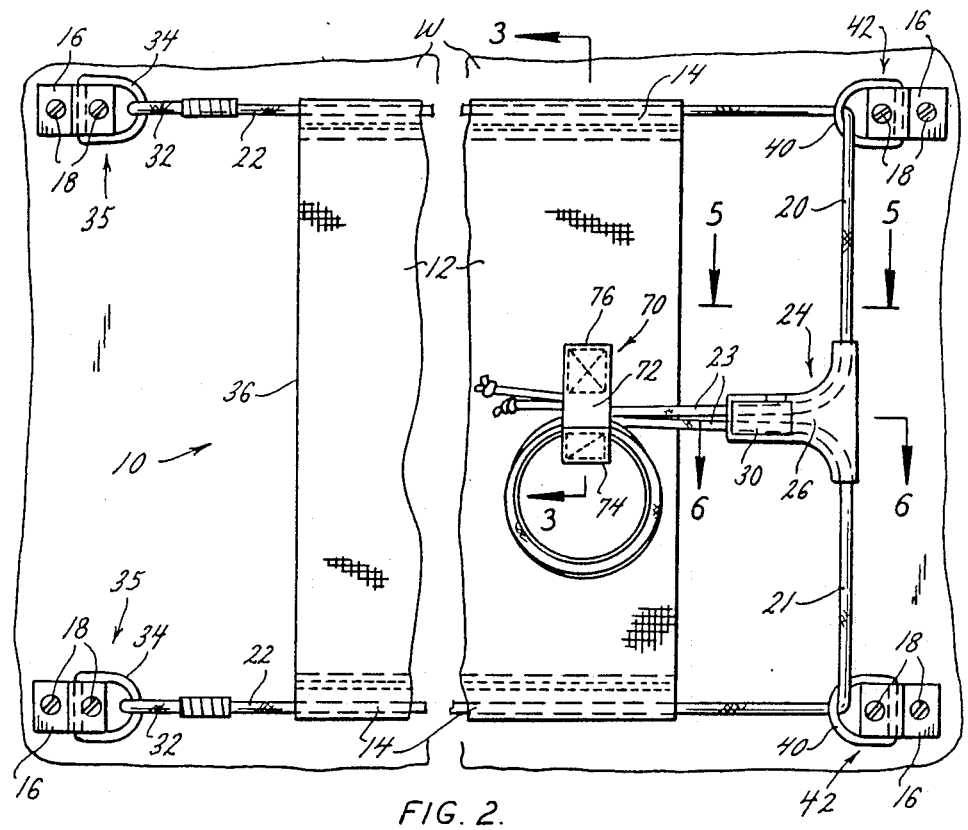
FIG. 2 is a fragmentary front elevation of a cargo restrainer.

Referring now to FIG. 1 of the drawings there is generally indicated at 10 a cargo restrainer for restraining cargo C carried in a vehicle compartment having walls W, such as the bed of a pick-up truck. The cargo restrainer comprises a generally rectangular panel 12 of flexible material such as nylon having sleeves 14 extending along opposing edges of the panel. Although the panel may be either a continuous piece of material, as shown in FIGS. 1 and 2, or discontinuous like a net, the continuous material is Preferred because cargo may become stuck in a net, especially where a number of loose items are being restrained. A plurality of anchors 16 are adapted to be mounted by fasteners 18, such as sheet metal screws, on at least one wall of the vehicle compartment at spaced apart locations. Cords 20, 21, constituting cord means in this embodiment, have first and second end portions 22,23. The cords extend through respective sleeves 14 of the panel 12 and engage the anchors 16 to suspend the panel between the anchors with the panel opposing a wall W of the vehicle compartment whereby, as shown in FIG. 1, cargo C may be placed between the wall and the panel for restraining the cargo during transport. Although all four anchors 16 are shown mounted on a single wall W of the pick-up truck bed in FIG. 1, it is to be understood that the anchors could be mounted on opposing or adjacent walls as is desired by the user for restraining a particular cargo.

Locking means, indicated generally at 24, for holding the cords at a predetermined tension comprises a locking member 26 for receiving the second end portions 23 of the cords therethrough and a lever 30 associated with the locking member which is adapted for movement from a first position in which the second end portions are free of engagement by the lever such that tension in the cords 20,21 and thus the restraining force applied by the panel 12 to the cargo C may be adjusted by varying the length of the second end portions extending through the locking member, and a second position in which the lever engages the second end portions for releasably locking them in the locking member to hold the tension applied to the cords.

Figure 4:
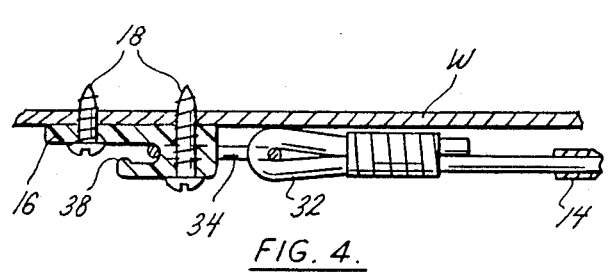
FIG. 4 is a vertical section of an anchor of a cargo restrainer and shows a fragment of a cord attached to the anchor.
Figure 3:
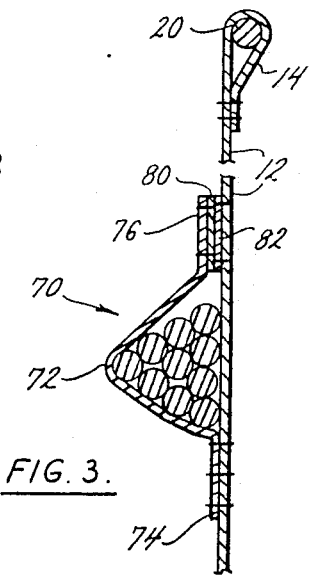
FIG. 3 is a partial section of the cargo restrainer of FIG. 2 taken in the plane including line 3—3.

The cords 20, 21 are made of elastic material which when stretched across the cargo being restrained closely conform to the contour of the cargo thereby causing the panel 12 to be more closely conformed to the cargo. Cargo restrained in this manner will not be jostled during transportation, which is of particular advantage if fragile items such as groceries are the cargo. The first end portion 22 of each cord 20, 21 includes a loop 32 which holds a ring 34 for attachment of the first end portion to a respective anchor 16 of a first pair of anchors 35 generally adjacent an edge 36 of the panel 12 for fixing the position of each first end portion with respect to a wall W of the vehicle compartment (see FIGS. 2, 4). Each anchor 16 in cross section, as shown in FIG. 4, is generally hook shaped and has an upwardly (as viewed in FIG. 4) projecting lip 38. The anchors 16 are made of semi-rigid resilient material and the ring 34 held in each first end portion 22 may be snapped into the anchor and retained on the anchor by the lip 38. From their respective anchors 16 of the first pair of anchors 35, the cords 20, 21 extend through a respective (upper or lower) sleeve 14 on opposing edges of the panel 12 and are received through a ring 40 attached to a respective anchor of a second pair of anchors 42, such that each cord is slidably connected to a respective anchor of the second pair of anchors. The second end portions 23 are then received through the locking member 26.

The locking member 26 has first and second entry portals 46, 48, and an exit portal 50 constituting respectively entry portal means and exit portal means in this embodiment. First and second arcuate passageways 54, 56 extend from respective first and second entry portals 46, 48 through the locking member and converge into a single passageway 58 terminating at the exit portal 50. The passageways as described constitute passaging means in this embodiment. Each second end portion 23 of the cords 20, 21 is received in a respective entry portal, 46 or 48, through the passageways in the locking member 26 and out the exit portal 50, with the cords being spaced relatively far apart at the entry portals and in side-by-side relationship at the exit portal. The locking member 26 is generally T-shaped, having a relatively narrow portion 60 adjacent the exit portal 50 and a relatively wide portion 62 adjacent the entry portals 46, 48 such that the locking member may be grasped around its narrow portion with one hand, with the hand braced against the wide portion while the second end portions 23 of the cords are pulled through the locking member with the other hand. The curved passageways 54, 56 allow the cords to slide easily through the locking member while changing the direction of travel and converge the cords to side-by-side relationship in the single passageway 58.

The locking member 26 has an opening 66 generally adjacent the exit portal which exposes the single passageway 58 in the locking member. The lever 30 associated with the locking member 26 has a camming surface 68 and is pivotally mounted over the opening 66 for swinging movement between the stated first and second positions. In the second Position, as shown in FIG. 6, the camming surface 68 projects into the single passageway 58 and engages the second end portions 23 of the cords 20, 21 for holding the tension applied to the cords. The amount of cord which is pulled through the locking member 26 will vary with the size or amount of cargo being carried and the amount of tension applied to the cords. Therefore, in the typical application there will be excess cord at the second end portions 23 which may be looped and held on the panel by cord holding means, indicated generally at 70. In this embodiment, the cord holding means comprises a strap 72 having first and second ends 74, 76 with the strap being affixed to the panel 12 at the first 74 end and releasably attached to the panel at the second end 76. Any releasable attachment at the second end is contemplated, but in this embodiment hook and loop type fasteners, often referred to by the trademark Velcro, are employed. More specifically, panels 80, 82, made of Velcro, are used for quick release and reattachment of the second end of the strap to the panel 12.

Thus is provided a cargo restrainer which may be tightly conformed to the cargo with a desired restraining force by grasping the locking member and pulling the second end portions of the cords through the locking member until the desired tension is achieved. The tension is then locked in both cords by swinging the lever from the first position to the second position. The cargo may be easily released by swinging the lever back to the first position allowing the cords to slide back through the locking member, relieving the tension in the cords and thus the restraining force applied to the cargo. The cargo restrainer may be easily mounted on any wall of the vehicle compartment as required for the type of cargo being carried by the user and is constructed simply with inexpensive materials such as nylon and plastic for economical manufacture.

As various changes could be made in the above constructions without departing from the scope of the invention, it is intended that all matter contained in the above description or shown in the accompanying drawings shall be interpreted as illustrative and not in a limiting sense.

What is claimed is:

1. A cargo restrainer for restraining cargo carried in a vehicle compartment having walls, such as the bed of a pick-up truck, the cargo restrainer comprising, a generally rectangular panel of flexible material having sleeves extending along opposing edges thereof, a plurality of anchors adapted to be mounted at spaced apart locations on at least one wall of the vehicle compartment, cord means extending through the sleeves of the panel and engaging the anchors at said locations to suspend the panel between the anchors with the panel opposing a wall of the vehicle compartment whereby cargo may be placed between the wall and the panel for restraint of the cargo during transport, and locking means for holding said cord means at a predetermined tension, said locking means comprising a locking member for receiving end portions of said cord means therethrough, and a lever associated with said locking member adapted for movement from a first position in which said end portions are free of engagement by the lever whereby the tension in said cord means and thus the restraining force applied by the panel to the cargo may be adjusted by varying the length of said end portions extending through said locking member, and a second position in which the lever engages said end portions for releasably locking said end portions in said locking member to hold the tension applied to said cord means.

2. The cargo restrainer as set forth in claim 1 wherein said locking member has entry portal means and exit portal means and passaging means extending through said locking member between said entry and exit portal means for receiving said end portions of said cord means through said locking member, said end portions being spaced relatively far apart at said entry portal means and in side-by-side relationship at said exit portal means.

3. The cargo restrainer as set forth in claim 2 wherein said entry portal means comprises first and second entry portals, said exit portal means comprises an exit portal and said passaging means comprises first and second arcuate passageways extending from respective first and second entry portals through said locking member and converging into a single passageway terminating at the exit portal in said locking member.

4. The cargo restrainer as set forth in claim 2 wherein said locking member has an opening therein generally adjacent said exit portal means, and wherein the lever has a camming surface, the lever being pivotally mounted on said locking member over the opening for swinging movement between said first position and said second position, whereby the camming surface of the lever projects into said passaging means when the lever is in said second position for holding the tension applied to said cord means.

5. The cargo restrainer as set forth in claim 1 wherein the lever associated with said locking member has a camming surface, the lever being pivotally mounted on said locking member for swinging movement between said first position and said second position, the camming surface engaging said end portions in said second position for holding the tension applied to said cord means.

6. The cargo restrainer as set forth in claim 1 comprising two cords, each having first and second end portions, each first end portion being connected to a respective anchor of a first pair of anchors generally adjacent an edge of the panel for fixing the position of each first end portion, each cord extending through a respective sleeve on opposing edges of the panel and each cord being slidably connected to a respective anchor of a second pair of anchors disposed adjacent an edge of the panel opposite said first pair of anchors, the second end portions being thence received through said locking member.

7. The cargo restrainer as set forth in claim 6 wherein the cords are made of elastic material.

8. The cargo restrainer as set forth in claim 6 comprising means for releasably holding excess cord.

9. The cargo restrainer as set forth in claim 8 wherein said cord holding means comprises a strap having first and second ends, the strap being affixed to the panel at the first end and releasably attached to the panel at its second end.

10. A cargo restrainer for restraining cargo carried in a vehicle compartment having walls, such as the bed of a pick-up truck, the cargo restrainer comprising,
  a generally rectangular panel of flexible material having sleeves extending along opposing edges thereof,
  a plurality of anchors adapted to be mounted at spaced apart locations on at least one wall of the vehicle compartment,
  cord means extending through the sleeves of the panel and engaging the anchors at said locations to suspend the panel between the anchors with the panel opposing a wall of the vehicle compartment whereby cargo may be placed between the wall and the panel for restraint of the cargo during transport,
  locking means for holding said cord means at a predetermined tension, said locking means comprising a locking member for receiving end portions of said cord means therethrough, and a lever associated with said locking member adapted for movement from a first position in which said end portions are free of engagement by the lever whereby the tension in said cord means and thus the restraining force applied by the panel to the cargo may be adjusted by varying the length of said end portions extending through said locking member, and a second position in which the lever engages said end portions for releasably locking said end portions in said locking member to hold the tension applied to said cord means, and
  means for releasably holding lengths of said cord means passed through said locking member.

11. The cargo restrainer as set forth in claim 10 wherein said locking member has entry portal means and exit portal means and passaging means extending through said locking member between said entry and exit portal means for receiving said end portions of said cord means through said locking member, said end portions being spaced relatively far apart at said entry portal means and in side-by-side relationship at said exit portal means.

12. The cargo restrainer as set forth in claim 11 wherein said entry portal means comprises first and second entry portals, said exit portal means comprises an exit portal and said passaging means comprises first and second arcuate passageways extending from respective first and second entry portals through said locking member and converging into a single passageway terminating at the exit portal in said locking member.

13. The cargo restrainer as set forth in claim 11 wherein said locking member has an opening therein generally adjacent said exit portal means, and wherein the lever has a camming surface, the lever being pivotally mounted on said locking member over the opening for swinging movement between said first position and said second position, whereby the camming surface of the lever projects into said passaging means when the lever is in said second position for holding the tension applied to said cord means.

14. The cargo restrainer as set forth in claim 10 wherein the lever associated with said locking member has a camming surface, the lever being pivotally mounted on said locking member for swinging movement between said first position and said second position, the camming surface engaging said end portions in said second position for holding the tension applied to said cord means.

15. The cargo restrainer as set forth in claim 10 comprising two cords, each having first and second end portions, each first end portion being connected to a respective anchor of a first Pair of anchors generally adjacent an edge of the panel for fixing the position of each first end portion, each cord extending through a respective sleeve on opposing edges of the panel and each cord being slidably connected to a respective anchor of a second pair of anchors disposed adjacent an edge of the panel opposite said first pair of anchors, the second end portions being thence received through said locking member.

16. The cargo restrainer as set forth in claim 15 wherein the cords are made of elastic material.

17. The cargo restrainer as set forth in claim 15 wherein cord holding means comprises a strap having first and second ends, the strap being affixed to the panel at the first end and releasably attached to the panel at its second end.

* * * * *